(12) United States Patent
Vanderhulst

(10) Patent No.: US 8,770,484 B2
(45) Date of Patent: Jul. 8, 2014

(54) DATA EXCHANGE USING STREAMED BARCODES

(71) Applicant: Alcatel-Lucent Bell N.V., Antwerp (BE)

(72) Inventor: Geert Vanderhulst, Aarschot (BE)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/624,459

(22) Filed: Sep. 21, 2012

(65) Prior Publication Data

US 2014/0084067 A1 Mar. 27, 2014

(51) Int. Cl.
*G06K 7/10* (2006.01)
(52) U.S. Cl.
USPC ............... 235/462.01; 235/462.09; 235/462.1
(58) Field of Classification Search
USPC ............... 235/462.01, 462.08, 462.09, 462.1, 235/462.24
See application file for complete search history.

(56) References Cited

U.S. PATENT DOCUMENTS

| 8,231,054 | B1 | 7/2012 | Kim | |
|---|---|---|---|---|
| 8,348,148 | B2* | 1/2013 | Acosta-Cazaubon | 235/375 |
| 2004/0026511 | A1* | 2/2004 | Cheung et al. | 235/462.1 |
| 2006/0071076 | A1 | 4/2006 | Tamayama | |
| 2008/0245869 | A1* | 10/2008 | Berkun et al. | 235/462.1 |
| 2010/0020970 | A1 | 1/2010 | Liu et al. | |
| 2010/0272193 | A1 | 10/2010 | Khan et al. | |
| 2010/0301115 | A1* | 12/2010 | Berkun | 235/380 |
| 2012/0067943 | A1* | 3/2012 | Saunders et al. | 235/375 |

OTHER PUBLICATIONS

International Search Report for PCT/IB2013/002090 dated Feb. 4, 2014.

* cited by examiner

*Primary Examiner* — Edwyn Labaze
(74) *Attorney, Agent, or Firm* — McCormick, Paulding & Huber, LLP

(57) ABSTRACT

A system and method for data exchange between a first device and a second device includes encoding data as a series of barcode frames on the first device and then successively displaying each barcode frame of the series of barcode frames on the first device. The second device captures the barcode frames being displayed by the first device to obtain the series of barcode frames and then decodes the captured series of barcode frames to complete the data exchange.

19 Claims, 4 Drawing Sheets

DATA EXCHANGE USING STREAMED BARCODES

FIELD OF THE INVENTION

The present invention relates to data exchange.

BACKGROUND OF THE INVENTION

Systems for the wirelessly exchanging data between two devices are known. One approach is Bluetooth, a wireless technology standard for exchanging data over short distances. Establishing a Bluetooth connection typically requires device discovery and pairing, which may be complex and time consuming. Therefore, Bluetooth may not be suitable for many data exchanges.

Near Field Communication technology may also be used to wirelessly exchange data between two devices over short distances. However, Near Field Communication may add incremental costs because of additional hardware.

Additionally, in these known systems, the data transmitted through the wireless signals between the connected devices might be intercepted by a third party device thereby compromising security.

Two-dimensional barcodes may be used to embed small amounts of digital data, such as website links or product identifiers, in everyday artifacts such as paper, clothes, or the like. Examples of the two-dimensional barcodes include Quick Response ("QR") codes, MaxiCodes, Data Matrix codes and Aztec codes. Two-dimensional barcodes may also be generated on mobile devices, for instance, by an airline application to allow a boarding pass to be displayed on the mobile device and scanned/understood at the airline boarding gate.

SUMMARY

According to an embodiment, a system and method for encoding data includes dividing the data into a plurality of portions and encoding each portion as a separate barcode frame to provide a series of barcode frames. The term barcode frame as used herein refers to pattern recognizable representation of data, which may be optically machine-readable.

According to an embodiment, the barcode frames are two-dimensional barcodes.

According to an embodiment, the method may include providing a first barcode frame in the series of barcode frames for indicating characteristics of the data. The characteristics may comprise at least one of a length of the data, a number of barcode frames encoding the data, a frame rate and a checksum.

According to an embodiment, the barcode frames are at least one of a fixed size and a varying size.

According to an embodiment, each barcode frame comprises an identifier indicative of a position of the barcode frame in the series of barcode frames.

According to an embodiment, the method may further comprise providing redundancy for error correction.

According to an embodiment, the method may further comprise successively displaying each barcode frame of the series of barcode frames. According to an embodiment, the method may also comprise capturing the successively displayed barcode frames. The method may further comprise decoding the series of barcode frames to provide the data. According to an embodiment, the barcode frames may be encoded at a first frame rate and captured at a second frame rate that is at least as fast as the first frame rate.

According to an embodiment, a transmitting device comprises a processor adapted to encode a piece of data as a series of barcode frames. The transmitting device also includes a display adapted to successively display each barcode frame of the series of barcode frames.

According to an embodiment, the transmitting device additionally comprises a camera adapted to sample images at intervals defined by a frame rate for capturing a second series of barcode frames. The processor may be adapted to decode the second series of barcode frames to provide a piece of data defined by the second series of barcode frames.

According to an embodiment, the processor may encode the piece of data with redundancy.

According to an embodiment, the processor provides a first barcode frame in the series of barcode frames that indicates characteristics of the data. The characteristics may include at least one of a length of the data, a number of barcode frames encoding the data, a frame rate and a checksum.

According to an embodiment, a receiving device comprises a camera adapted to sample images at intervals defined by a frame rate for capturing a series of barcode frames. The receiving device also includes a processor adapted to decode the series of barcode frames to provide a piece of data defined by the series of barcode frames.

According to an embodiment, the processor decodes the series of barcode frames with Reed-Solomon codes to detect and correct for barcode frames that are not captured by the camera.

According to an embodiment, the receiving device further comprises a display adapted to display the piece of data defined by the series of barcode frames.

According to an embodiment, the receiving device further comprises a display. The processor may be adapted to encode a second piece of data as a second series of barcode frames and the display is adapted to successively display each barcode frame of the second series of barcode frames.

These and other embodiments will become apparent in light of the following detailed description herein, with reference to the accompanying drawings.

DETAILED DESCRIPTION

Figure 1:
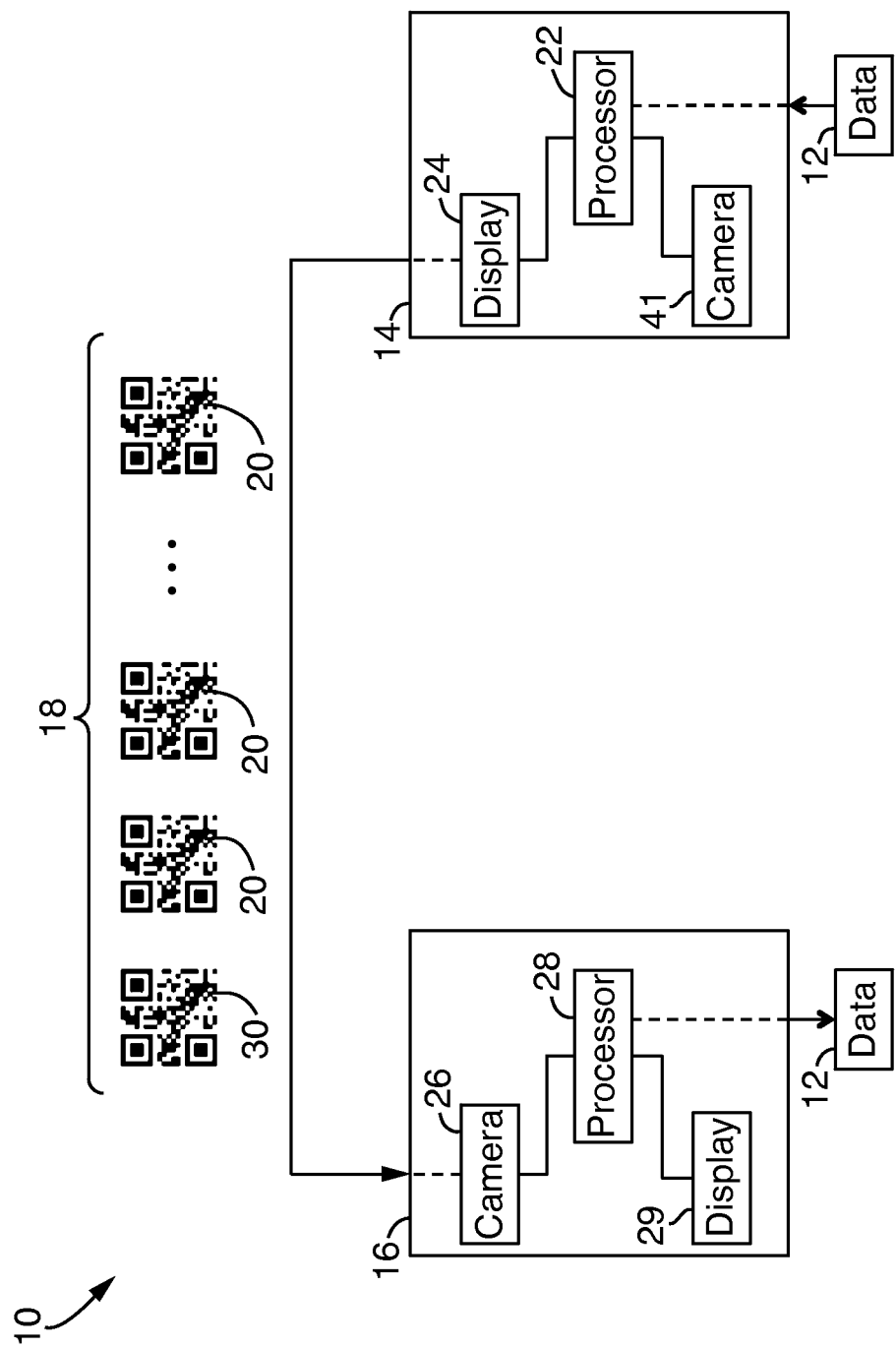
FIG. 1 is a schematic diagram of a system according to an embodiment.

Referring to FIG. 1, a system 10 for transmitting data 12 from a first device 14 to a second device 16 through a series of barcode frames 18 is shown. The term barcode frame as used herein refers to pattern recognizable representation of data, which may be optically machine-readable. The series of barcode frames 18 may include two-dimensional barcode frames 20 that represent data using varying patterns of rectangles, dots, hexagons and/or other geometric patterns in two-dimensions such as, for example, QR codes, MaxiCodes, Data Matrix codes, Aztec codes, or the like.

The first device 14 transmitting the data 12 includes a processor 22 adapted to encode the data 12 as the series of barcode frames 18 and a display 24 for successively displaying each barcode frame 20 of the series of barcode frames 18. The display 24 may be, for example, an LCD screen, an LED screen, OLED display, an E-ink display or any other similar system capable of displaying the barcode frames 20. The first device 14 may be, for example, a mobile device such as a smart phone, a tablet, an e-book reader or the like.

The second device 16 includes a camera 26 for capturing the series of barcode frames 18 displayed by the first device 14 and a processor 28 for decoding the series of barcode frames 18. In some embodiments, the second device 16 may also include a display 29 for conveying information to a user. The second device 16 may be, for example, a mobile device with a webcam such as a smart phone, a tablet, augmented reality glasses, holographic system or the like.

The data 12 may be of an arbitrary length and the number of barcode frames 20 encoding the data 12 as the series of barcode frames 18 may be selected by the first device 14 in dependence upon the length of the data 12. The series of barcode frames 18 may include a header frame 30 in addition to the barcode frames 20 encoding the data 12. The header frame 30 may provide characteristics of the data transfer such as the length of the data 12, the number of barcode frames 20 used to encode the data 12, a frame rate at which successive barcode frames 20 of the series of barcode frames 18 will be displayed on the display 24 and a checksum to verify the consistency of the data 12.

In operation, the data 12 may be encoded as the series of barcode frames 18 by the first device 14 and then captured in real-time by the second device 16 and decoded to the original data 12 without the need of a network connecting the first device 14 with the second device 16. As discussed above, the data 12 may be of an arbitrary size/length L. The data 12 is encoded by K barcode frames 20, each having a size/length $L_K$, to provide the series of barcode frames 18 with a length that is the sum of the lengths $L_K$ of the barcode frames 20 and equals the length L of the data 12. The K barcode frames 20 may be of fixed or varying sizes to provide the total size/length for the series of barcode frames 18 that is equal to the size/length L of the data 12.

Figure 2:
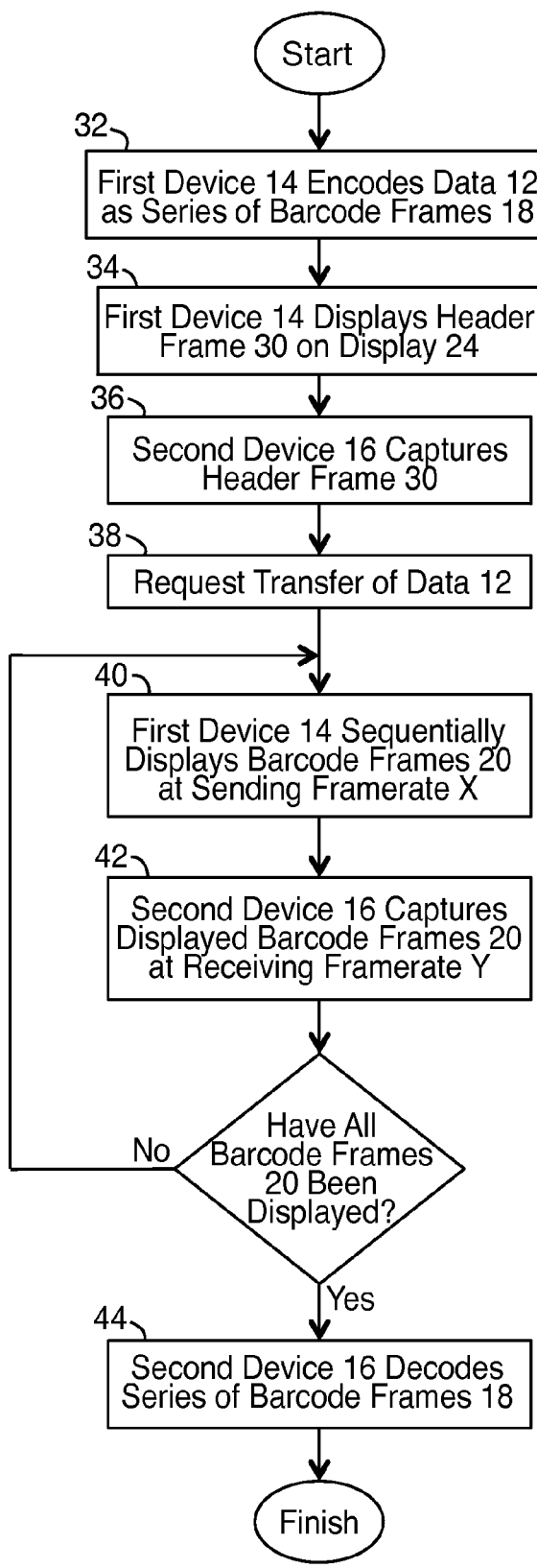
FIG. 2 is a flow diagram of an embodiment for data transfer according to the system of FIG. 1.

Referring to FIG. 2, to transfer the data 12, of arbitrary length, from the first device 14 to the second device 16, the first device 14 encodes the data 12 as the series of barcode frames 18 at a sending frame rate X at 32. In some embodiments, each barcode frame 20 of the series of barcode frames 18 may include an identifier (e.g. a number) denoting its position in the series of barcode frames 18.

At 34, the first device may initially present the header frame 30 on the display 24 to provide the second device 16 with information about the data transfer and the series of barcode frames 18. The second device 16 scans this header frame 30 at 36 and, in some embodiments, may use the information provided by the header frame 30 to configure settings (e.g. focal distance, aperture, and the like) for the camera 26 to capture the upcoming barcode frames 20 of the series of barcode frames 18. Thus, the second device 16 may advantageously reuse the same settings for scanning each barcode frame 20 of the series of barcode frames 18 to avoid refocusing the lens of the camera 26 during the transfer.

At 38, transfer of the data 12 is requested. Transfer may be requested in a variety of ways, including an automatic request, a manual request or a semi-automatic request. For example, if the display 24 of the first device 14 includes a touch-sensitive screen, transfer may be requested by a user touching a portion of the screen around the header frame 30 being displayed thereon. Once transfer of the data 12 has been requested, the first device 14 sequentially displays each barcode frame 20 of the series of barcode frames 18 on the display 24 at the sending frame rate X at 40.

In some embodiments, transfer of the data 12 may be requested at 38 using a camera 41, shown in FIG. 1, (or a proximity sensor (not shown)) of the first device 14. In these embodiments, the first device 14 may be configured to recognize a gesture made by the user, which may trigger the first device 14 to sequentially display each barcode frame 20 of the series of barcode frames 18 on the display 24 at the sending frame rate X at 40. In embodiments where the first device 14 includes a proximity sensor (not shown) in addition to the camera 41, shown in FIG. 1, signals from both the camera 41, shown in FIG. 1, and the proximity sensor (not shown) may be required to request the transfer of data 12 at 38 to provide redundancy to the system. Alternatively, in some embodiments where the first device 14 includes a proximity sensor (not shown) in addition to the camera 41, shown in FIG. 1, a signal from either the camera 41, shown in FIG. 1, or the proximity sensor (not shown) may be sufficient to request the transfer of data 12 at 38 to make the transfer request easier to initiate.

In some embodiments, transfer of the data 12 may be requested at 38 by the second device 16, itself. For example, once the header frame 30 is scanned at 34, the second device 16 may signal the first device 14 to start the transfer of data 12 using a light pulse (e.g. from infrared or built-in flash LEDs of the camera 26), an audio signal (e.g. from a speaker (not shown)) or the like. Once transfer of data 12 is requested, the first device 14 sequentially displays each barcode frame 20 of the series of barcode frames 18 on the display 24 at the sending frame rate X at 40.

As the first device 14 displays the series of barcode frames 18 at 40, the second device 16 captures the displayed barcode frames 20 at 42 through the camera 26 at a receiving frame rate Y. Preferably, the receiving frame rate Y is at least equal to the sending frame rate X to reduce a number of barcode frames 20 that are displayed by the first device 14 but not captured by the second device 16. In particular, there is a chance that some of the barcode frames 20 of the series of barcode frames 18 may not be captured in time by the second device 16, since the sending frame rate X of the first device 14 and the receiving frame rate Y of the second device 16 may not be synchronized (i.e. some barcode frames 20 may be displayed by the first device 14 and then removed from the display before the second device 16 is scheduled to capture). To minimize the number of barcode frames 20 that are displayed by the first device 14 but not captured by the second device 16, the receiving frame rate Y may be significantly larger than the sending frame rate X in some embodiments. Additionally, to compensate for the non-capture of any barcode frames 20 of the series of barcode frames 18 by the second device 16, the first device 14 may introduce redundancy in the data 12 so that the second device 16 may still decode the received barcode frames 20 even though one or more barcode frames 20 was missed during capturing at 42. For example, Reed-Solomon codes or other similar known methods for introducing redundancy in data may be used to introduce the redundancy in the data 12 by the first device 14. Additionally, as discussed above, the header frame 30 may include a checksum to allow the second device 16 to verify the consistency of the data 12.

Although the transfer request at 38 has been described as an initial step to be performed before the entire series of barcode frames 18 is transferred, in some embodiments, the second device 16 may signal the first device 14 before each barcode frame 20 of the series of barcode frames 18 is displayed, i.e. the second device 16 may signal the first device 14 to display the next barcode frame 20 in the series when the second device 16 is ready to capture the next barcode frame 20. In this embodiment, the second device 16 is, itself, able to dictate the (maximal) frame rate X since the second device 16 dictates when the first device 14 displays each barcode frame 20. Preferably, the second device 16 is able to quickly signal the first device 14, e.g. from infrared or built-in flash LEDs of the camera 26, and the signal may be available during substantially the entire data transfer so that the second device 16 may continue to signal the first device 14 when ready.

Still referring to FIG. 2, after the second device 16 captures the barcode frames 20 of the series of barcode frames 18, the second device decodes the series of barcode frames 18 to complete the transfer of data 12 at 44. Thus, the system 10, shown in FIG. 1, advantageously provides for the transfer of data 12 from the first device 14 to the second device 16 using the series of barcode frames 18 projected one barcode frame 20 after another on the display 24, thereby overcoming the size restrictions associated with two-dimensional barcodes. The system and method for data transfer provides for a secure data exchange between the first device 14 and second device 16 without the need for dedicated hardware or the need to establish a network connecting the two devices, such as a Bluetooth connection. Additionally, since the system 10, shown in FIG. 1, does not require a network connecting the first device 14 and second device 16, the system does not result in the emission of wireless network signals that could be intercepted by a third party. Furthermore, since a network is not required, the system 10, shown in FIG. 1, and method for data transfer are compatible with widely adopted hardware, i.e. webcams and displays, available on a variety of commercially available products, such as smartphones, tablets and the like.

Figure 3:
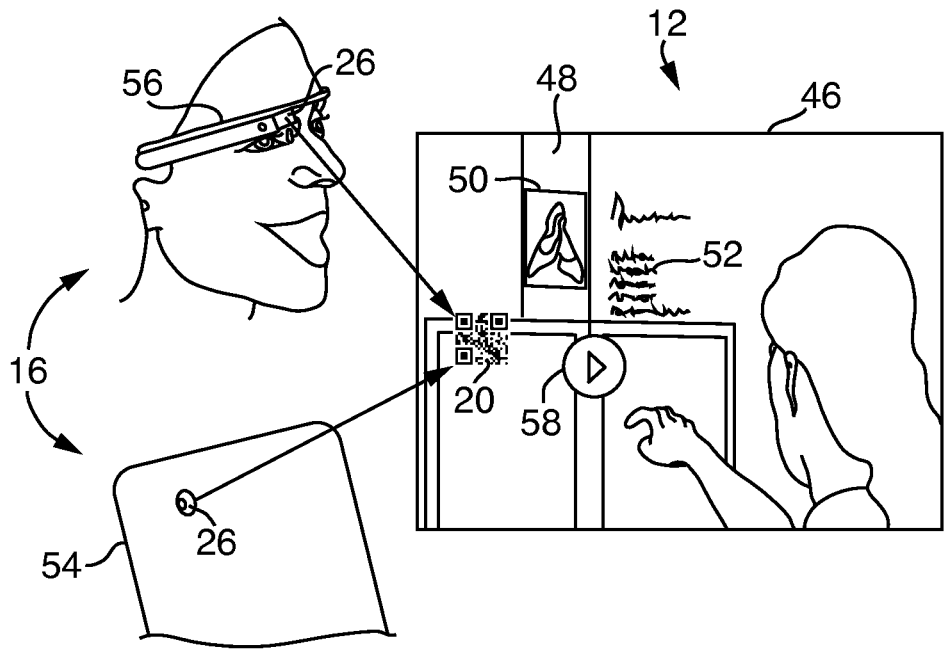
FIG. 3 is a schematic diagram of an exemplary embodiment of the system of FIG. 1.

Referring to FIG. 3, an exemplary embodiment is illustrated for the transfer of data 12, shown in FIG. 1, such as a file, from the first device 14 to one or more second devices 16. In this exemplary embodiment, the first device 14 may be an interactive shopping window 46 including a large touch-sensitive semi-transparent screen 48 as the display 24 where a user may interact with the screen 48 to retrieve information about products 50, promotions 52 or the like. The method for data transfer described above may be used to transfer deals and/or items of interest from the interactive shopping window 46 to the second device 16, which may be, for example, the user's personal mobile device 54, augmented reality glasses 56, such as Project Glass by Google, or the like. The product 50 or promotion 52 may be presented on the screen 48 as a file of a few kilobytes. The file may include, for example, a thumbnail of the product 50 or promotion 52, details about the product 50 or promotion 52, a uniform resource locator (URL) where more information can be retrieved about the product 50 or promotion 52, keywords for searching through bookmarked items, or any other similar information with regard to the product 50 or promotion 52. Transfer of the file may be initiated by the second device 16 scanning barcode frame 20 (e.g. the header frame 30, shown in FIG. 1) displayed on the screen 48 along with the product 50 or promotion 52 of interest. The file is then transferred as the series of barcode frames 18, shown in FIG. 1, according to the method discussed above.

In some embodiments, the user may tap a button 58 displayed on the screen 48 (e.g. a 'play' button or the like) to initiate the file transfer. In these embodiments, the button 58 may replace the header frame 30, shown in FIG. 1, so that, once the button 58 is pressed, the file is transferred as the series of barcode frames 18, shown in FIG. 1, according to the method discussed above. Thus, the button 58 may eliminate the header frame 30, shown in FIG. 1. Alternatively, the header frame 30, shown in FIG. 1, may simply be the first barcode frame 20 displayed in the series of barcode frames 18, shown in FIG. 1, after the file transfer is initiated using the button 58.

As should be understood from the discussion above, the camera 26 of the second device 16 should remain pointed at the barcode frames 20 being displayed on the screen 48 during the transfer. Thus, in some embodiments, the file or files being transferred are preferably relatively small files that require fewer barcode frames 20 in the series of barcode frames 18, shown in FIG. 1, and, therefore, may be transferred in a second or in a few seconds. Smaller files may be particularly advantageous in applications where the second device is a user's personal mobile device 54, augmented reality glasses 56 or any similar device being held or worn by the user since the user will not need to maintain the position of the device for a long period of time.

Figure 4:
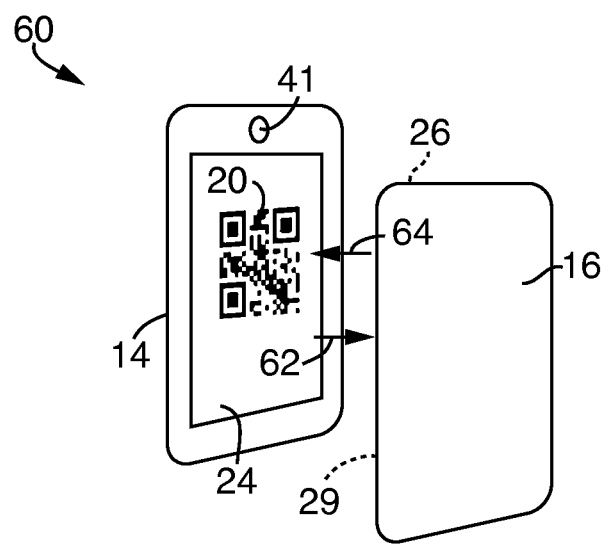
FIG. 4 is a perspective view of an embodiment for two-way data exchange according to the method of FIG. 2.
Figure 5:
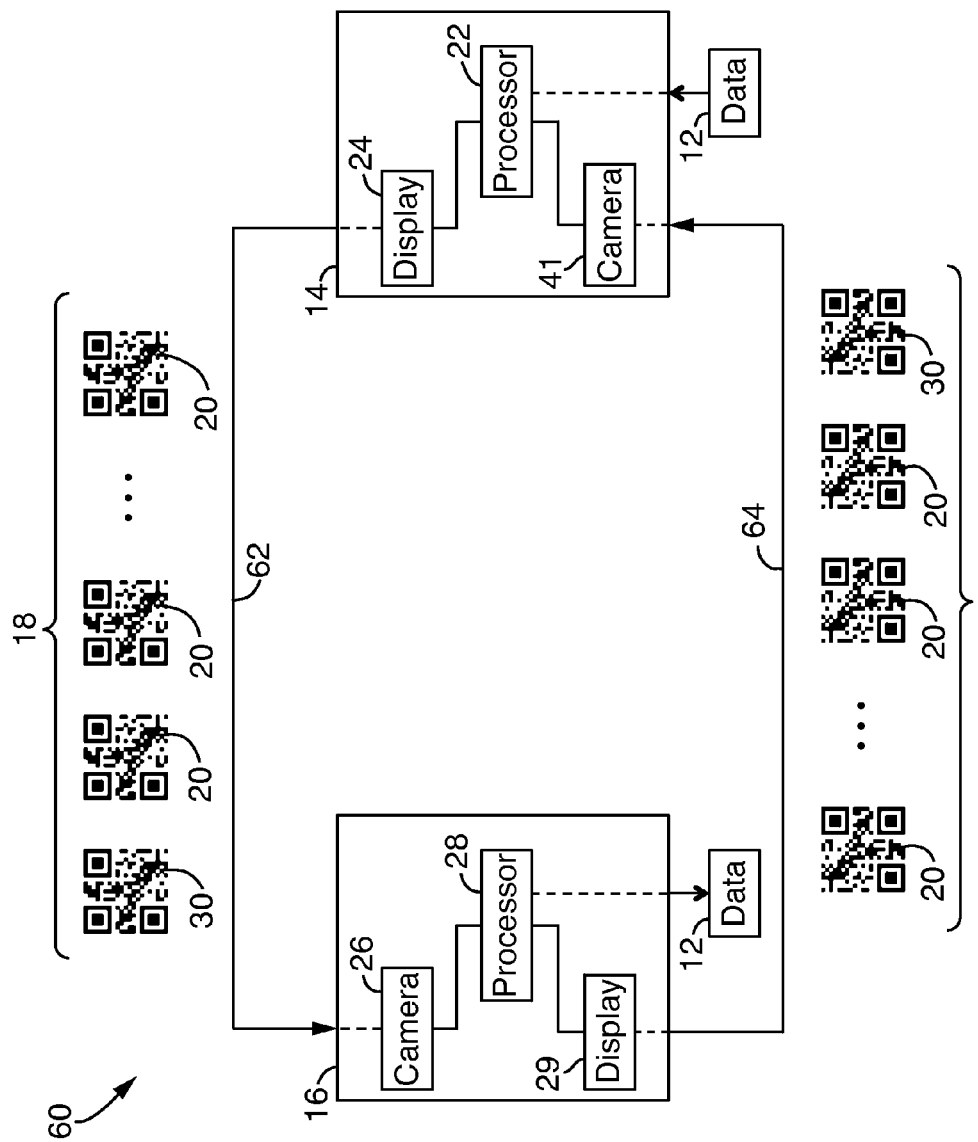
FIG. 5 is a schematic diagram of the system for two-way data exchange of FIG. 4.

Referring to FIG. 4 and FIG. 5, in some embodiments, the method for data transfer discussed above may be used for a two-way secure data exchange 60 by pointing the first device 14 and second device 16 toward one another at a short distance from one another. In this embodiment, both the first device 14 and second device 16 include displays 24, 29 and cameras 26, 41. The first device 14 is positioned with its camera 41 facing the display 29 of the second device 16 and the second device 16 is positioned with its camera 26 facing the display 24 of the first device 14. For example, the first device 14 and second device 16 may be smartphones with front-facing cameras 26, 41 that allow the first device 14 and second device 16 to be positioned as described. The first device 14 and second device 16 should be positioned such that the camera 26, 41 of each device captures the display screen 24, 29 of the other device, or at least an area of the screen that is to display the series of barcode frames 18, shown in FIG. 5. Once the first device 14 and the second device 16 are positioned facing one another, data 12 can be exchanged in both a first direction 62 and a second direction 64 between the two devices, according to the method described above. For example, data 12 may be exchanged in the first direction 62 by the first device 14 displaying the series of barcode frames 18, shown in FIG. 5, and the second device 16 capturing the series of barcode frames 18, shown in FIG. 5, through its camera 26. Similarly, data 12 may be exchanged in the second direction 64 by the second device 16 displaying the series of barcode frames 18, shown in FIG. 5, and the first device 14 capturing the series of barcode frames 18, shown in FIG. 5, through its camera 41. In some embodiments, data 12 may even be transferred between the first device 14 and second device 16 in both the first direction 62 and second direction 64 simultaneously using the method described above.

Provided that the first device 14 and second device 16 are positioned at a close distance from one another, such that each device's display content is shielded from third parties, data 12 is transferred in a secure manner since the transfer does not require any wireless network signals being emitted that could be intercepted. This two-way secure data exchange 60 may be used, for example, to facilitate mobile payments by allowing the mobile devices to securely exchange billing data (e.g. amount due, selected products, credited loyalty points, and the like), to exchange payment data (e.g. debit or credit card details, authorization codes for the transaction, or the like) and to confirm payment. The two-way data exchange 60 may also be used, for example, to securely automate device pairing, e.g. negotiate/exchange PIN codes and device names, to allow the devices to seamlessly setup a secure Bluetooth or WiFi connection therebetween without wireless signals being emitted.

These systems and methods for data exchange, advantageously overcome the size restrictions associated with data transfers using barcodes by providing systems and methods for data transfer between devices using the series of barcode frames 18 projected one barcode frame 20 after another on the display 24. The systems and methods for data transfer also provide for secure one-way and two-way data exchange between devices without the emission of wireless network signals that could be intercepted by third parties. Additionally, as discussed above, the systems and methods are advantageously compatible with widely adopted hardware, such as webcams and displays, available on a variety of commercially available products, thereby allowing a multitude of devices to exchange data through the systems and methods described herein.

Although this invention has been shown and described with respect to the detailed embodiments thereof, it will be understood by those skilled in the art that various changes in form and detail thereof may be made without departing from the spirit and the scope of the invention.

What is claimed is:

1. A method for encoding data comprising:
dividing the data into a plurality of portions;
encoding each portion as a separate barcode frame to provide a series of barcode frames; and
providing a first barcode frame in the series of barcode frames for indicating characteristics of the data.

2. The method according to claim 1, wherein the separate barcode frames are two-dimensional barcodes.

3. The method according to claim 1, wherein the characteristics comprise at least one of a length of the data, a number of barcode frames encoding the data, a frame rate and a checksum.

4. The method according to claim 1, wherein the separate barcode frames are at least one of a fixed size and a varying size.

5. The method according to claim 1, wherein each barcode frame comprises an identifier indicative of a position of the barcode frame in the series of barcode frames.

6. The method according to claim 1, further comprising the step of providing redundancy for error correction.

7. The method according to claim 1, further comprising the step of successively displaying each barcode frame of the series of barcode frames.

8. The method according to claim 7, further comprising the step of capturing the successively displayed barcode frames.

9. The method according to claim 8, further comprising the step of decoding the series of barcode frames to provide the data encoded as the series of barcode frames.

10. A method for encoding data comprising:
dividing the data into a plurality of portions;
encoding each portion as a separate barcode frame to provide a series of barcode frames;
successively displaying each barcode frame of the series of barcode frames; and
capturing the successively displayed barcode frames;
wherein the barcode frames are displayed at a first frame rate; and
wherein the barcode frames are captured at a second frame rate that is at least as fast as the first frame rate.

11. A transmitting device comprising:
a processor adapted to encode a piece of data as a series of barcode frames; and
a display adapted to successively display each barcode frame of the series of barcode frames;
wherein the processor encodes a first barcode frame in the series of barcode frames to include characteristics of the piece of data.

12. The transmitting device according to claim 11, wherein the processor encodes the piece of data with redundancy.

13. The transmitting device according to claim 11, wherein the characteristics include at least one of a length of the data, a number of barcode frames encoding the data, a frame rate and a checksum.

14. A transmitting device comprising:
a processor adapted to encode a piece of data as a series of barcode frames;
a display adapted to successively display each barcode frame of the series of barcode frames; and
a camera adapted to sample images at intervals defined by a frame rate for capturing a second series of barcode frames;
wherein the processor is adapted to decode the second series of barcode frames to provide a piece of data defined by the second series of barcode frames.

15. A receiving device comprising:
a camera adapted to sample images at intervals defined by a frame rate for capturing a series of barcode frames; and
a processor adapted to decode the series of barcode frames to provide a piece of data defined by the series of barcode frames;
wherein a first barcode frame in the series of barcode frames includes characteristics of the piece of data.

16. The receiving device according to claim 15, wherein the processor decodes the series of barcode frames with Reed-Solomon codes to detect and correct for barcode frames that are not captured by the camera.

17. The receiving device according to claim 15, further comprising a display adapted to display the piece of data defined by the series of barcode frames.

18. A receiving device comprising:
a camera adapted to sample images at intervals defined by a frame rate for capturing a series of barcode frames;
a processor adapted to decode the series of barcode frames to provide a piece of data defined by the series of barcode frames; and
a display;
wherein the processor is adapted to encode a second piece of data as a second series of barcode frames; and
wherein the display is adapted to successively display each barcode frame of the second series of barcode frames.

19. A method for decoding data comprising:
capturing barcode frames of a series of successively displayed barcode frames;
decoding each barcode frame to provide a portion of data; and
combining the portions of data
wherein a first barcode frame in the series of successively displayed barcode frames includes characteristics of the data.

* * * * *